United States Patent
Shimizu et al.

(10) Patent No.: US 6,803,939 B2
(45) Date of Patent: Oct. 12, 2004

(54) OPTICAL PRINTING HEAD OF SIDE-PRINTING DEVICE FOR PRINTING DATA ON PHOTOSENSITIVE MATERIAL

(75) Inventors: Masayuki Shimizu, Kanagawa (JP); Tomoyuki Shimoda, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 14 days.

(21) Appl. No.: 09/955,951

(22) Filed: Sep. 20, 2001

(65) Prior Publication Data

US 2002/0033876 A1 Mar. 21, 2002

(30) Foreign Application Priority Data

Sep. 20, 2000 (JP) .......................... 2000-285923

(51) Int. Cl.[7] ................ B41J 2/385; B41J 2/45
(52) U.S. Cl. .................... 347/238; 347/130
(58) Field of Search ................ 347/130, 134, 347/136, 232, 238, 241, 256, 258, 242, 243; 399/221, 186, 366

(56) References Cited

U.S. PATENT DOCUMENTS

| 4,524,372 A | * | 6/1985 | De Cock et al. | 347/238 |
|---|---|---|---|---|
| 4,544,259 A | | 10/1985 | Kanaoka et al. | 355/1 |
| 4,734,734 A | * | 3/1988 | Yano | 399/186 |
| 5,444,520 A | * | 8/1995 | Murano | 399/221 |
| 5,923,358 A | * | 7/1999 | Yamakawa | 347/238 |
| 6,034,712 A | * | 3/2000 | Iwasaki | 347/241 |
| 6,037,964 A | * | 3/2000 | Gomi et al. | 347/238 |
| 6,208,829 B1 | * | 3/2001 | Shimoda | 399/366 |
| 6,219,074 B1 | * | 4/2001 | Chosa et al. | 347/130 |

FOREIGN PATENT DOCUMENTS

| JP | 58-219543 | | 12/1983 | ...... G03B/27/52 |
|---|---|---|---|---|
| JP | 2-100043 | | 4/1990 | ...... G03C/1/00 |
| JP | 4-284484 | * | 10/1992 | ...... G03G/21/00 |
| JP | 6-271484 | * | 11/1998 | ...... G03G/15/04 |
| JP | 2000-156525 | * | 6/2000 | ...... H01L/33/00 |

* cited by examiner

Primary Examiner—Hai Pham
(74) Attorney, Agent, or Firm—Sughrue Mion, PLLC

(57) ABSTRACT

An optical printing head of a side-printing device has an array of LED chips mounted on a substrate along a perpendicular direction to a conveying direction of a photosensitive material. The LED chips are driven in synchronism with the conveying movement of the photosensitive material, to print data of the photosensitive material as a latent image line by line on a side margin of the photosensitive material. Each LED chip corresponds to one pixel of the latent image, and is partitioned from each other by partitioning plates, for preventing interference between rays from adjacent LED chips. A diffusion plate is placed on the partitioning plates, to equalize luminance of rays from each LED chip.

32 Claims, 8 Drawing Sheets

FILM CONVEYING DIRECTION

OPTICAL PRINTING HEAD OF SIDE-PRINTING DEVICE FOR PRINTING DATA ON PHOTOSENSITIVE MATERIAL

BACKGROUND OF THE INVENTION

1. Field of the Invention

The present invention relates to an optical printing head of a side-printing device for printing data on a side margin of a photosensitive material, like a photo filmstrip. More particularly, the present invention relates to an optical printing head having a plurality of light emitting elements which are arranged side by side and so partitioned that light beams from the individual light emitting elements will not be mixed.

2. Background Art

Manufacturing processes of photosensitive materials include a side-printing process for photographically printing film data in the form of characters, marks and bar codes on a side margin of the photosensitive material outside those areas used for photographing picture frames. The film data printed on the side margins includes a manufacturer's name, and ISO sensitivity or film speed of the photosensitive material. The film data is side-printed as a latent image and is developed as visible images concurrently with the picture frames photographed on the photosensitive material. Thereafter, the film data is manually or mechanically read out and utilized as film data for controlling printing the photographed images.

The side printing process uses a specific optical printing head, hereinafter called the side-printing head. An example of the side-printing head is disclosed in Japanese Laid-open Patent Application No. 2-100043. The side-printing head of this prior art has a light source consisting of an array of light emitting diodes (LEDs), each LED consists of LED chips emitting rays of different wavelengths. An inlet end of a large diameter optical fiber is placed in opposition to each LED. An outlet end of the large diameter optical fiber is connected to an optical fiber bundle that consists of a plurality of small diameter optical fibers, so the rays from the light source is projected from outlet ends of the small diameter optical fibers.

The rays of different wavelengths are mixed uniformly with each other through the large diameter optical fiber, and then an uniformly mixed light beam is projected from the outlet end of each individual optical fiber bundle. The outlet ends of the optical fiber bundles are arranged in a line perpendicularly to a conveying direction of the photosensitive material. Some of the LEDs are sequentially turned on and off in synchronism with the conveying movement, and the light beams from the outlet ends of the optical fiber bundles are projected through a converging lens system onto the side margins of the photosensitive material, printing latent images of characters, marks or bar codes.

Another example of a side-printing head is disclosed in Japanese Laid-open Patent Application No. 58-219543, wherein an array of LEDs are aligned in a perpendicular direction to a conveying direction of a photosensitive material, to project light beams toward the photosensitive material. Each of the LEDs corresponds to one pixel of one line of a latent image, and is connected to an LED driver. In synchronism with the conveying movement of the photosensitive material, the LEDs are turned on or off in accordance with their positions in the array. Light beams from the LEDs are focused through a converging lens system onto a side margin of the photosensitive material, thereby recording latent images of characters, marks and bar codes.

The former prior art has a problem in that the amount of light at the outlet end of the optical fiber bundle is remarkably lessened from the light amount from the LED. In addition, the apparatus is complicated in structure and expensive, and needs a large installation space. On the other hand, the latter prior art has a problem in that the light beams from the neighboring LEDs can interfere with each other. In that case, the individual pixels cannot be recorded at proper densities or in proper dot patterns. It is possible to prevent the interference between the light beams by providing enough spacing between the LEDs. However, the wider the spacing between the LEDs, the spacing between the pixels of the printed image becomes the wider, lowering the quality of the printed image.

SUMMARY OF THE INVENTION

In view of the foregoing, an object of the present invention is to provide an optical printing head of a side-printing device, that prevents interference between those light beams which are to be used for printing different pixels, provides good quality of printed images, and is compact and inexpensive.

Another object of the present invention is to provide a side-printing device using such a side-printing head.

According to the present invention, an optical printing head of a side-printing device for printing data of a photosensitive material as a latent image on a side margin of the photosensitive material while the photosensitive material is being conveyed in a direction the optical printing head comprises a plurality of light emitting elements mounted on a substrate and arranged along a perpendicular direction to the conveying direction of the photosensitive material; a partitioning device mounted on the substrate, for partitioning the light emitting elements from each other, to prevent interference between rays from adjacent ones of the light emitting elements; a diffusion device for diffusing rays from the light emitting elements, to equalize luminance of rays from each light emitting element; and a converging lens system for projecting rays from the light emitting elements onto the photosensitive material, wherein each of the light emitting elements is assigned to record a dot at a time when driven in synchronism with the conveying movement of the photosensitive material, thereby to print the latent image line by line.

Since the optical printing head of the present invention does not use any optical fibers, luminance reduction is remarkably suppressed in comparison with the above described prior arts, so the optical printing head of the present invention is useful for the side-printing on a low speed photosensitive material, or achieves a high speed side-printing process, or may use a lower current for driving the light emitting elements. Omitting the optical fibers also simplifies the structure, cuts the cost of the printing head, and makes the printing head compact and sturdy.

According to a preferred embodiment, the optical printing head further comprises a mask plate disposed between the diffusion device and the converging lens system, the mask plate having openings in correspondence with the light emitting elements, the openings having a shape equal to an expected shape of the dot.

According to another aspect of the present invention, a side-printing device for printing data of a photosensitive material as a latent image on a side margin of the photosensitive material while the photosensitive material is being conveyed in a direction, comprises three optical printing heads for emitting rays of three colors respectively, and each of the optical printing heads comprises a plurality of light emitting elements mounted on a substrate and arranged along a perpendicular direction to the conveying direction of the photosensitive material, the light emitting elements emitting rays of one of the three colors; a partitioning device mounted on the substrate, for partitioning the light emitting elements from each other; a diffusion device for diffusing rays from the light emitting elements; and a converging lens system for projecting rays from the light emitting elements onto the photosensitive material, wherein each of the light emitting elements of the three optical printing heads is assigned to record a dot of one color at a time when driven in synchronism with the conveying movement of the photo sensitive material, thereby to print the latent image line by line in the three colors.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
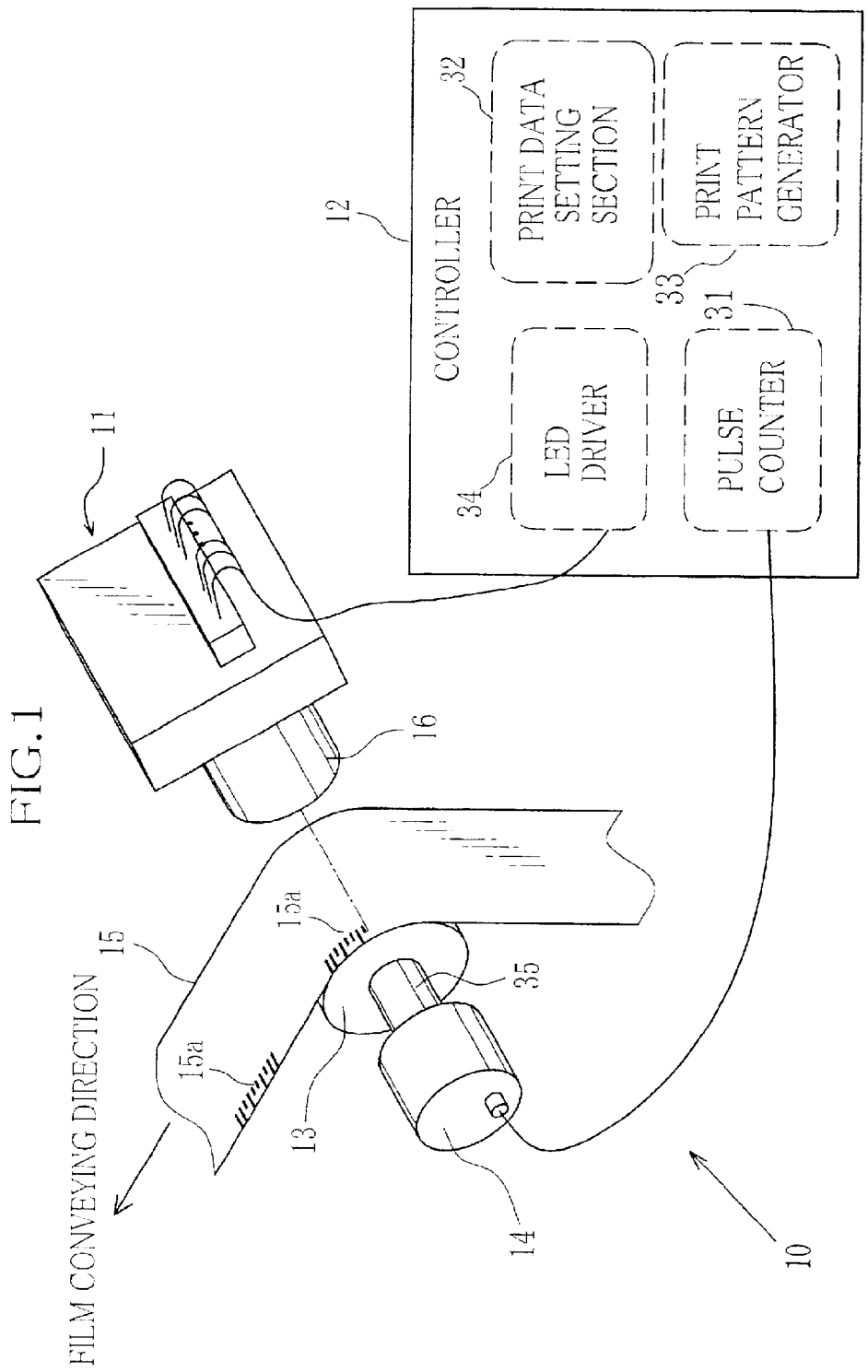
FIG. 1 is an explanatory diagram illustrating a side-printing device according to an embodiment of the present invention.

FIG. 1 schematically shows essential parts of an embodiment of a side-printing device. The side-printing device 10 is mainly constituted of a printing head 11, a controller 12, a suction drum 13, and a rotary encoder 14. The printing head 11 is placed in face of a photo film web 15 that is supported on and conveyed through the suction drum 13 in its lengthwise direction, hereinafter called the film conveying direction. The printing head 11 is constituted of an LED array unit 20 and a converging lens system 16.

Figure 2:
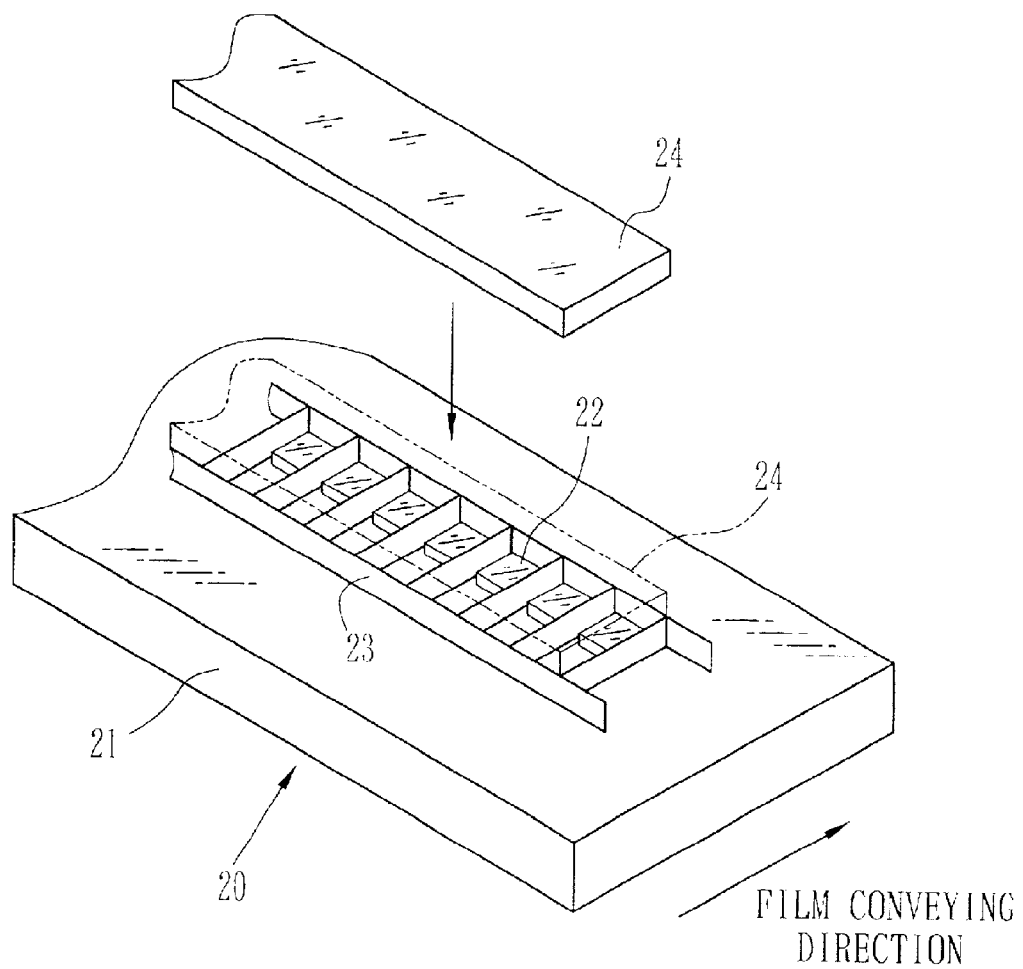
FIG. 2 is an exploded perspective view of an LED array of a printing head of the first embodiment.

As shown in FIG. 2, the LED array unit 20 is mainly constituted of a substrate 21, LED chips 22, partitioning plates 23, and a diffusion plate 24. The LED chips 22 are arranged on the substrate 21 at regular intervals in a perpendicular direction to the film conveying direction, i.e. in a widthwise direction of the photo film web 15. Each of the LED chips 22 is assigned to record a dot, as a pixel of a latent image 15a photographically recorded on the photo film web 15. The partitioning plates 23 made of thin blade partition the individual LED chips 22 from each other. The partitioning plates 23 prevent mixture or interference between rays that are emitted from the adjacent LED chips 22, and thus prevent confusion between the pixels.

Figure 3:
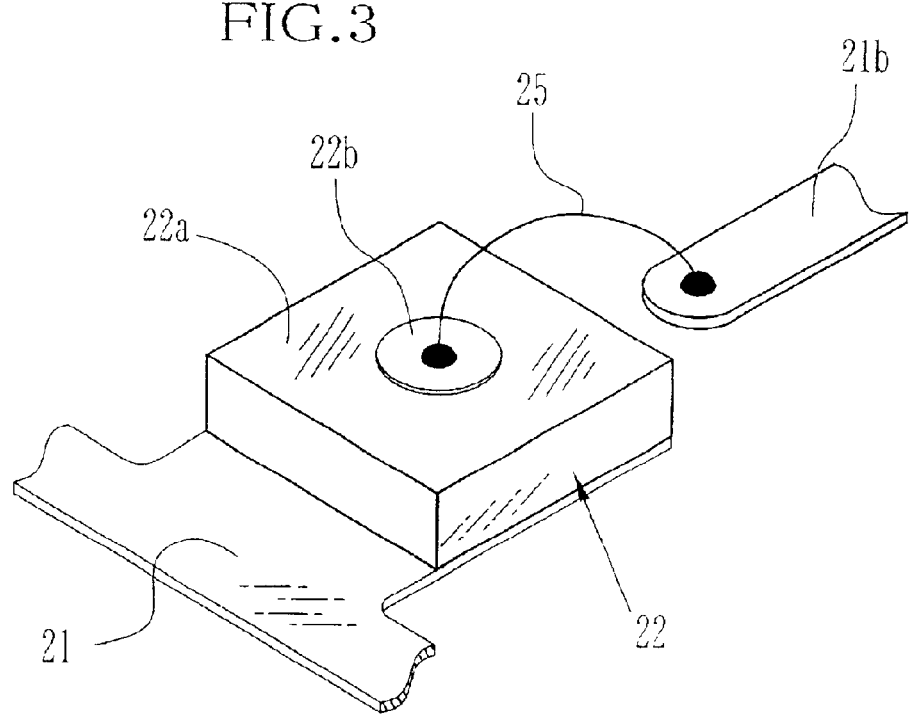
FIG. 3 is a perspective view of an LED chip as an element of the LED array.

The diffusion plate 24 is placed above the partitioning plates 23, for diffusing rays from the LED chips 22 to project light beams of an uniform luminance for each pixel. As shown in FIG. 3, an electrode 22b is provided at a center of an light emitting surface 22a that is located on a top side of each LED chip 22. The electrode 22b is electrically connected to an electrode 21b that is formed on the substrate 21 through a bonding wire 25. Because the electrode 22b does not emit light, the light emitting surface 22a of each LED chip 22 has a dark spot at the center, so the luminance becomes uneven. For this reason, the diffusion plate 24 is provided to equalize the luminance of the light beams for each pixel.

The diffusion plate 24 is made of a semi-transparent material, and contains an array of large number of micro lenses whose size is several micro millimeters. These micro lenses are adjustable in the light diffusion range, e.g. gradually by the degree of 10°, relative to rays falling in the normal direction to the lens surfaces. As the rays are diffused through the micro lenses, luminance reduction through the diffusion plate 24 is less than that through a conventional diffusion plate that is made of a fogged glass or the like. According to the present invention, the LED chips 22 emit the same color. For example, where the photosensitive material to record data thereon is a color positive film for the movies, green or blue emitting diode chips are used as the LED chips 22, because red rays are used for sound tracks. For color negative film for the movies, or for photographic film, orange or yellow emitting diode chips are used as the LED chips 22. If the photosensitive material is for X-ray photography, green or blue emitting diode chips are used as the LED chips 22.

Figure 4:
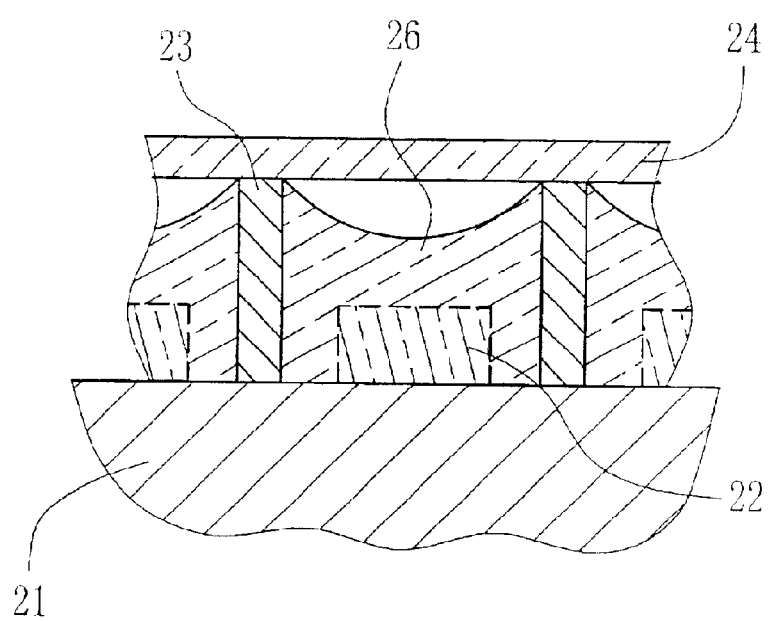
FIG. 4 is a sectional view of the LED array.

As shown in FIG. 4, spaces between the LED chips 22 and the partitioning plates 23 are filled up with a transparent coating material 26 to protect the LED chips 22 and the bonding wires 25. Because the diffusion plate 24 is placed on the top side of the partitioning plates 23, the coating material 26 should not protrude upward from the partitioning plates 23.

Referring back to FIG. 1, the controller 12 is provided with a pulse counter 31, a print data setup section 32, a print pattern generator 33, and an LED driver 34. The rotary encoder 14 is coupled to a rotary shaft 35 of the suction drum 13, to generate a pulse each time the suction drum 13 rotates through a predetermined angle. The pulses from the rotary encoder 14 are sent to the pulse counter 31 on the basis of the count of the pulse counter 31. The controller 12 detects a conveyed length of the photo film web 15 through the suction drum 13, and determines timings of driving the LED chips 22 in synchronism with the conveying movement of the photo film web 15.

The print data setup section 32 stores side-print data for printing characters, marks and bar codes on a lateral side of the photo film web 15, and the side-print data may be entered through a not-shown input device. The print pattern generator 33 produces a pattern signal that designates those LED chips 22 which are to be driven at each driving timing to form the latent image 15a on the photo film web 15 in accordance with the print data set up in the print data setup section 32.

At each driving timing, the LED driver 34 drives some of the LED chips 22 according to the pattern signal with a predetermined LED current for a predetermined light emission time. Rays from the LED chips 22 are projected through the converging lens system 16 onto the side margin of the photo film web 15, thereby recording a dot pattern on the photo film web 15 corresponding to the driven LED chips. In this way, the photo film web 15 is exposed to a line of rays projected from selected ones of the LED chips 22 at each LED driving timing, to record the latent image 15a as several rows of dot patterns on the side margin of the photo film web 15. The LED current and the light emission time of the LED chips 22 are determined on the basis of the film speed and the conveying speed of the photo film web 15.

The above-described embodiment operates as follows.

First the side-print data, representative of characters, marks or bar codes that are to be recorded as a latent image on the side margin of the photo film web 15, is entered to the print data setting section 32. Upon a print start operation on the side-printing device 10, the controller 12 calculates an advanced length of the photo film web 15 from the number of the encoder pulses counted by the pulse counter 31, and determines the LED driving timing for driving the LED chips 22 in synchronism with the conveying movement of the photo film web 15.

The print pattern generator 33 produces the pattern signal from the side-print data entered in the print data setting section 32, such that the pattern signal designates those LED chips 22 which are to be driven at each LED driving timing in order to record the side-print data as a latent image 15a. Then, the LED driver 34 drives some of the LED chips 22 according to the pattern signal from the print pattern generator 33, with the predetermined LED current for the predetermined light emission time, at each LED driving timing.

Rays from the LED chips 22 are projected as an LED pattern through the lens 16 onto the side margin of the photo film web 15 at each LED driving timing. By sequentially projecting a plurality of LED patterns in this way in synchronism with the conveying movement of the photo film web 15, the latent image 15a is recorded as a plurality of dot patterns on the side margin of the photo film web 15 in correspondence with the side-print data as entered in the print data setting section 32.

Figure 5:
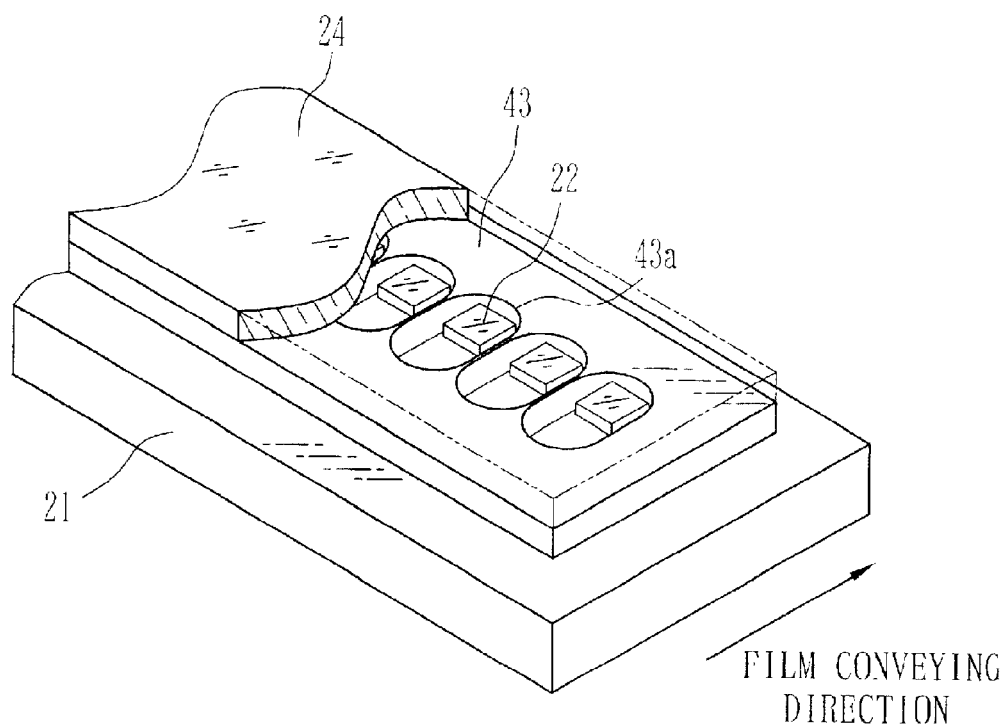
FIG. 5 is a perspective view of an LED array, partly broken away, according to a second embodiment of the present invention.

Although the partitioning plates 23 are made of thin blades in the above embodiment, it is alternatively possible to use a single partitioning plate 43 made of a structural material, including plastic, ceramics, metal, wood and so on, as shown in FIG. 5. The partitioning plate 43 has openings 43a for exposing the LED chips 22 which are formed by a mechanical process or by etching.

Figure 6:
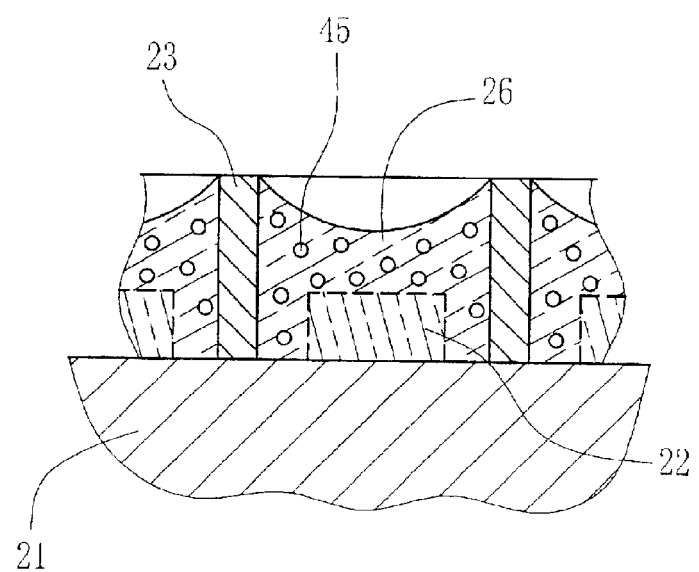
FIG. 6 is a sectional view of an LED array according to a third embodiment of the present invention.

In the above embodiments, the diffusion plate 24 is disposed above the partitioning plates 23 or the partitioning plate 43, for diffusing the rays from the LED chips 22. In alternative, as shown in FIG. 6, light-diffusing micro particles 45 with a high reflection factor are mixed in the transparent coating material 26 that fills up the spacing between the LED chips 22 and the partitioning plates 23 to protect the LED chips 22 and the bonding wires 25. Thereby, the micro particles 45 diffuse the rays from the LED chips 22, in place of the diffusion plate 24. It is also possible to place a diffusion plate on the partitioning plate 23 in addition to the light-diffusing micro particles 45 mixed in the coating material 26. Thereby, the rays from the LED chips 22 will be diffused more uniformly.

Figure 7:
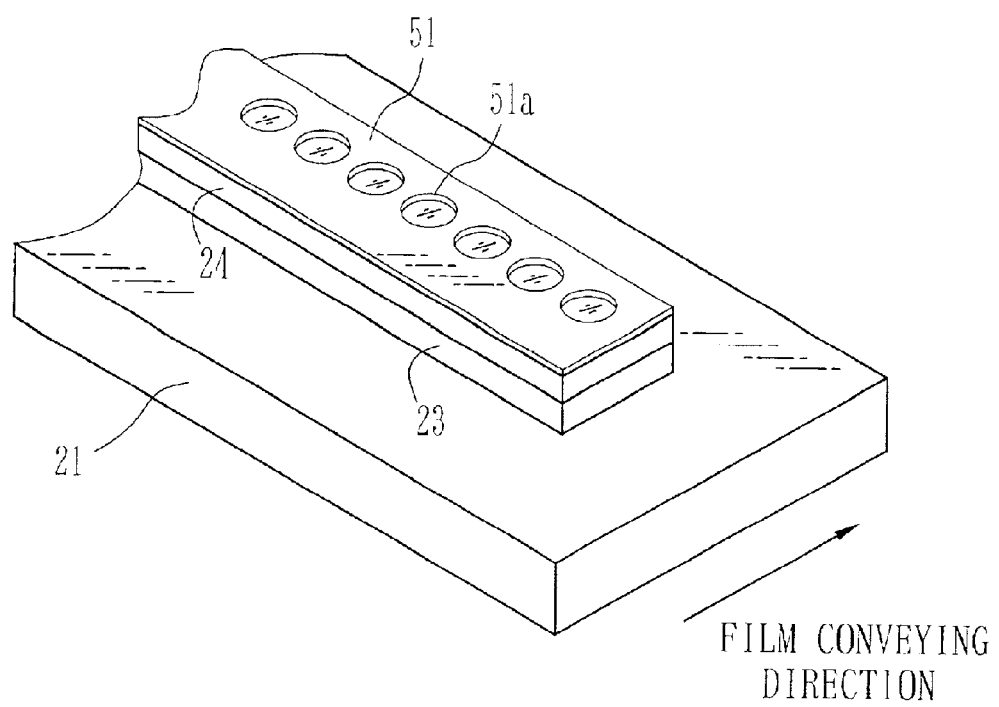
FIG. 7 is a perspective view of an LED array according to a fourth embodiment of the present invention.

Although the above embodiments merely use the partitioning plates 23 or the partitioning plate 43 for preventing the interference between the rays from the adjacent LED chips, another embodiment places a mask plate 51 on the diffusion plate 24, as shown in FIG. 7, for limiting heading directions of the rays from the LED chips 22, as an additional preventive device against interference between the rays. In that case, each opening 51a of the mask plates 51 has a shape corresponding to an expected shape of each dot to be recorded on the photo film web 15.

Figure 8:
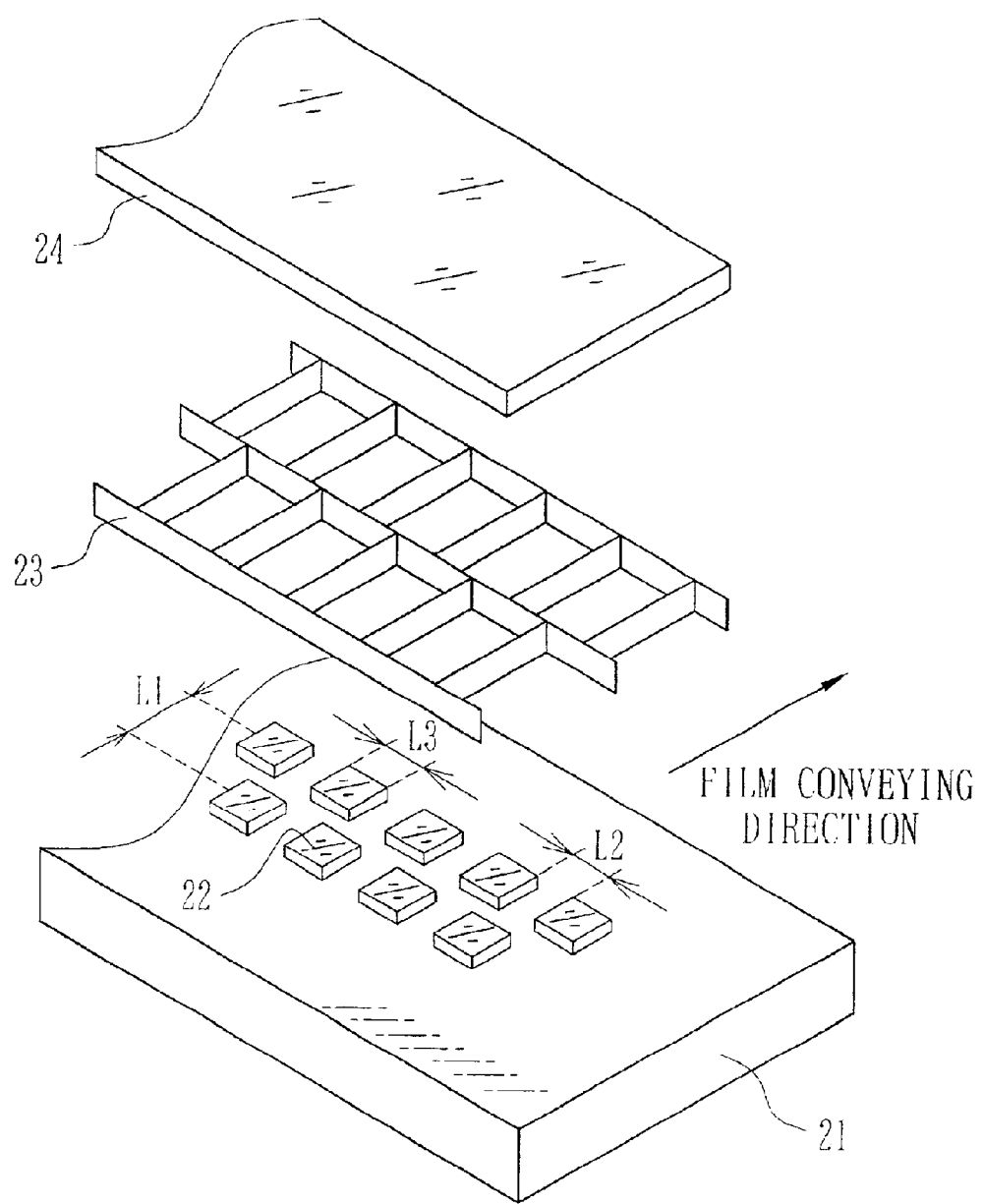
FIG. 8 is an exploded perspective view of an LED array according to a fifth embodiment of the present invention.

Although the LED chips 22 are arranged in a row along the widthwise direction of the photo film web 15, the LED chips 22 may be arranged in two rows, as shown in FIG. 8. In this embodiment, the LED chips 22 of the first row are staggered from those of the second row, and the center of the first row is spaced by a length L1 from the center of the second row in the film conveying direction. According to this embodiment, a latent image 15a is recorded in the following manner. First, the LED chips 22 of the first row are driven in accordance with a first pattern signal at a first LED driving timing, so a first dot pattern is recorded in a line on a side margin of the photo film web 15. Next, when the photo film web 15 is conveyed by the length L1 and thus the first dot pattern comes to a position where rays from the LED chips 22 of the second row are projected onto, the LED chips 22 of the second row are driven in accordance with a second pattern signal. Thus, a second dot pattern is recorded on the same line as the first dot pattern.

In this way, a line of dot pattern is recorded by sequentially driving the first and second rows of the LED chips 22 at the first and second LED driving timings. By alternately driving the first and second rows of the LED chips 22 in synchronism with the conveying movement of the photo film web 15, the latent image 15a is recorded line by line on the side margin of the photo film web 15. The LED chips 22 are spaced from each other in the film widthwise direction by a length L2 that is preferably equal to or slightly less than a length L3 of the individual LED chip 22 in the film widthwise direction. Because of the staggered arrangement, the LED chips 22 of the second row record dots between those dots previously recorded by the LED chips 22 of the first row. So the dots, i.e. the pixels of the latent image 15a will be closely recorded on the photo film web 15, improving the quality of the printed image as compared to the case where the LED chips 22 are arranged in a single line.

Although the embodiments shown in FIGS. 7 and 8 have been described with respect to the LED array unit that uses the partitioning plates 23 and the diffusion plate 24, it is of course possible to provide the mask plate 51 or two rows of LED chips in combination with the embodiment shown in FIG. 5 or the embodiment shown in FIG. 6, or the like.

Figure 9:
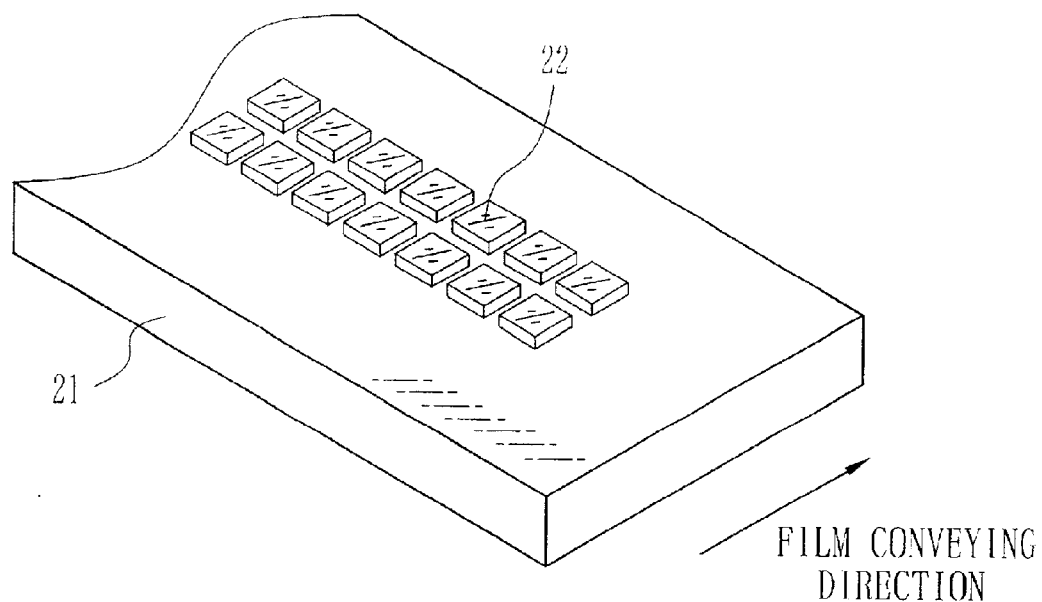
FIG. 9 is a perspective view of an LED array according to a sixth embodiment of the present invention, wherein LED chips are arranged in a different pattern.

In another embodiment shown in FIG. 9, the LED chips 22 are arranged in two rows, but aligned both in the film conveying direction and the film widthwise direction. In this embodiment, the LED chips 22 of the first row emit rays of a different color from the LED chips 22 of the second row. The LED chips 22 of the second row are driven after the LED chips 22 of the first row in the same way as described with respect to the embodiment of FIG. 8. In result, each line of an image is recorded in two colors by exposing the photo film web 15 to the rays of the two colors in an alternating fashion. According to this embodiment, the intensity of rays from the LED chips 22 will not be reduced, unlike the conventional device where different colors are mixed inside optical fibers. Therefore, a sufficient light amount is obtained even while two colors are used for recording the latent image 15a of the side-print data. It is possible to provide three or more rows of the LED chips 22, each row emitting a different color, so as to record the latent image 15a by use of three or more colors.

Figure 10:
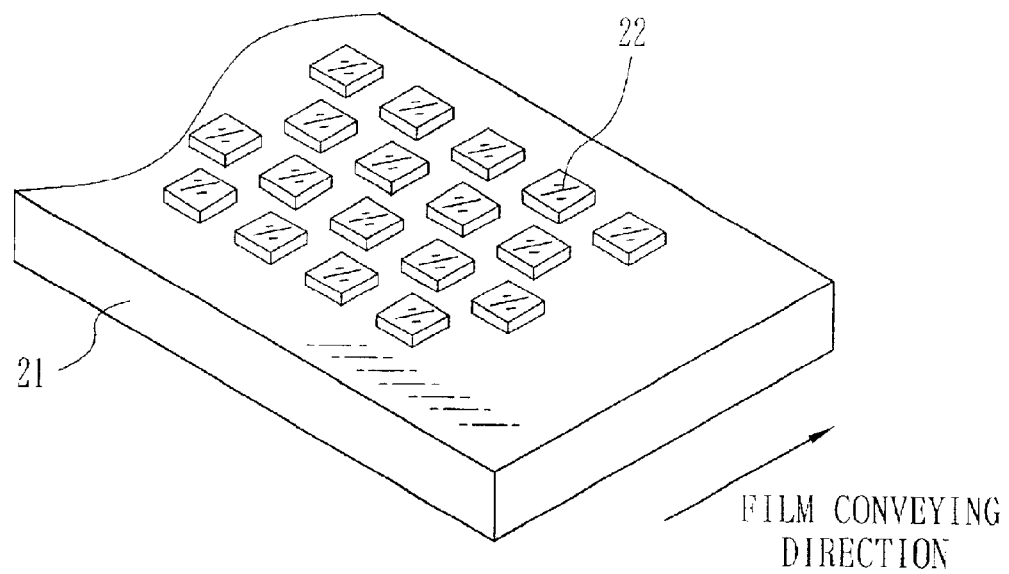
FIG. 10 is a perspective view of an LED array according to a seventh embodiment of the present invention, wherein LED chips are arranged in staggered four rows.

The LED chips 22 may be arranged in four rows, as shown in FIG. 10. In this embodiment, the LED chips 22 of the first and second rows are staggered from each other and emit a same color, whereas the LED chips 22 of the third and fourth rows are staggered from each other and emit another color. The LED chips 22 are driven sequentially from the first row to the fourth row in synchronism with the conveying movement of the photo film web 15, so each line of a latent image 15a is recorded by exposing the photo film web 15 to the rays from the four rows, in a similar manner as described with respect to the embodiment of FIG. 8. Thus, dot or pixels of the latent image 15a are recorded closely to each other, i.e. without gaps. Also, the light amount for recording the latent image 15a is not reduced even while two colors are mixed. It is also possible to provide a third couple of rows of LED chips for emitting a third color. In that case, the LED chips of the third couple of rows are staggered from each other in the same way as shown in FIG. 8 or 10. It may be possible to provide more than three couples of rows of LED chips for emitting more than three colors of rays.

Figure 11:
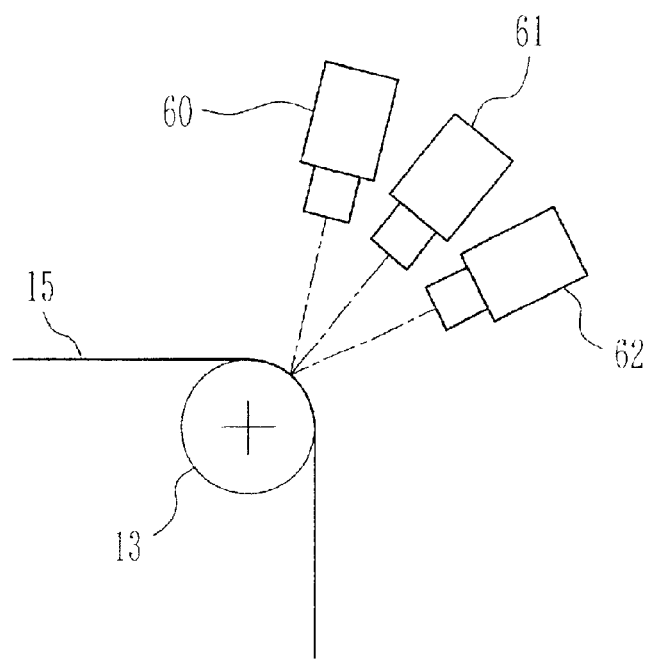
FIG. 11 is a schematic diagram illustrating a side-printing device having three printing heads for three colors, according to an eighth embodiment of the present invention.

According to another embodiment shown in FIG. 11, three side-printing heads 60, 61 and 62 are provided for projecting red, green and blue rays toward the photo film web 15 respectively. That is, the side-printing head 60 includes an array of red light emitting diodes, the side-printing head 61 includes an array of green light emitting diodes, and the side-printing head 62 includes an array of blue light emitting diodes. The three color rays are concurrently projected in the same line on the photo film web 15, so a latent image 15a is recorded line by line in three colors. The three colors are not limited to the combination of red, green and blue, but another combination of colors may be used for recording the latent image 15a.

Figure 12:
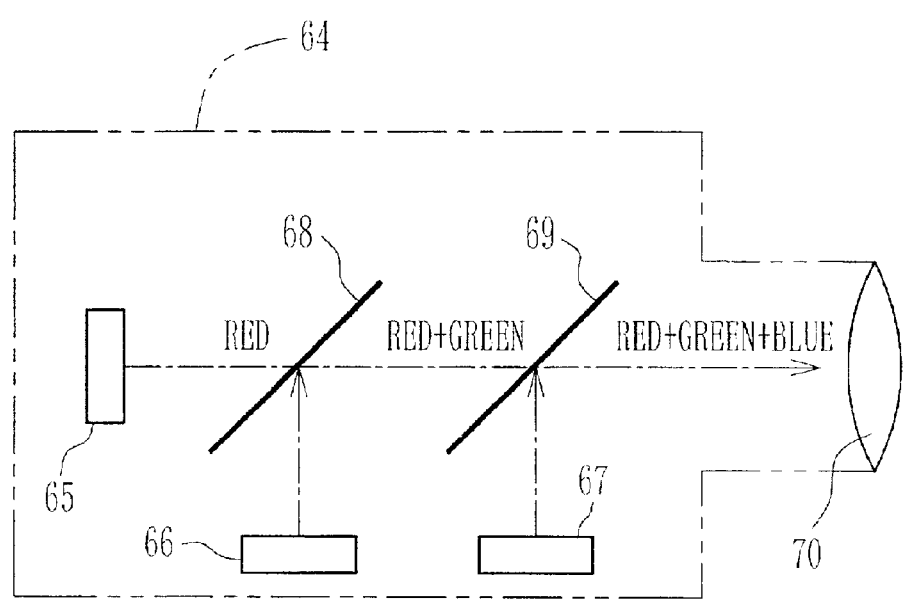
FIG. 12 is an explanatory diagram illustrating an optical structure of a printing head according to a ninth embodiment of the present invention.

According to a further embodiment shown in FIG. 12, a side-printing head 64 is provided with three LED array units 65, 66 and 67 for emitting rays of red, green and blue respectively. The LED array units 66 and 67 for green and blue are oriented such that their optical axes extend perpendicularly to an optical axis of the LED array unit 65 for red. The optical axis of the LED array unit 65 coincides with an optical axis of a projection lens 70 of the side-printing head 64. Dichroic mirrors 68 and 69 are placed at the cross points of the optical axes of the LED array units 66 and 67 with the optical axis of the LED array unit 65. The dichroic mirror 68 lets the red rays from the LED array unit 65 pass through it, and reflects the green rays from the LED array unit 66, so the red and green rays are directed toward the dichroic mirror 69. The second dichroic mirror 69 lets the red and green rays pass through it, and reflects the blue rays from the LED array unit 67, so the red, green and blue rays are directed toward the projection lens 70. Thus, the three-color rays are concurrently projected from the side-printing head 64. Also in this embodiment, a partitioning device for partitioning between the LED chips of the LED array units 65, 66 and 67 should be provided for preventing interference between rays from the adjacent LED chips. Also the light intensity from each LED chip is equalized by providing a diffusion device in the same way as in the above embodiment.

Although the present invention has been described so far with respect to the preferred embodiments shown in the drawings, the present invention is not to be limited to the above embodiments but, on the contrary, various modifications will be possible to those skilled in the art without departing from the scope of claims appended hereto.

What is claimed is:

1. An optical printing head of a side-printing device for printing data of a photosensitive material as a latent image on a side margin of said photosensitive material while said photosensitive material is being conveyed in a direction, said optical printing head comprising:
   a plurality of light emitting elements mounted on a substrate and arranged along a perpendicular direction to the conveying direction of said photosensitive material;
   a partitioning device mounted on said substrate, for partitioning said light emitting elements from each other, to prevent interference between rays from adjacent ones of said light emitting elements;
   a diffusion device for diffusing rays from said light emitting elements, to equalize luminance of rays from each light emitting element; and
   a converging lens system for projecting rays from said light emitting elements onto said photosensitive material, wherein each of said light emitting elements is assigned to record a dot at a time when driven in synchronism with the conveying movement of said photosensitive material, thereby to print said latent image line by line.

2. An optical printing head as recited in claim 1, further comprising mask plate disposed between said diffusion device and said converging lens system, said mask plate having openings in correspondence with said light emitting elements, said openings limiting heading directions of the rays from said light emitting elements and having a shape corresponding to an expected shape of said dot.

3. An optical printing head as recited in claim 1, wherein said partitioning device comprises a plurality of thin plates placed between said light emitting elements.

4. An optical printing head as recited in claim 3, wherein spaces between said thin plates are filled up with a transparent coating material to coat said light emitting elements.

5. An optical printing head as recited in claim 4, wherein said diffusion device comprises light diffusing particles mixed into said coating material.

6. An optical printing head as recited in claim 1, wherein said partitioning device comprises a thick plate having openings for exposing said light emitting elements.

7. An optical printing head as recited in claim 6, wherein said openings of said thick plate are filled up with a transparent coating material to coat said light emitting elements.

8. An optical printing head as recited in claim 7, wherein said diffusion device comprises light diffusing particles mixed into said transparent coating material.

9. An optical printing head as recited in claim 1, wherein said diffusion device is a diffusion plate mounted on said partitioning device, to cover up all of said light emitting elements.

10. An optical printing head as recited in claim 1, wherein said light emitting elements are arranged in a plurality of rows, each row extending in the perpendicular direction to the conveying direction of said photosensitive material.

11. An optical printing head as recited in claim 10, wherein said light emitting elements of each row are spaced from each other by a distance that is equal to or slightly less than a length of each light emitting element in the perpendicular direction to the conveying direction of said photosensitive material, and said light emitting elements of one row are staggered from those of adjacent rows in said perpendicular direction by an amount approximately equal to said distance.

12. An optical printing head as recited in claim 11, wherein adjacent two rows of said light emitting elements are paired to emit rays of a different color from other pairs of rows of said light emitting elements, thereby to print said latent image in different colors.

13. An optical printing head as recited in claim 10, wherein said light emitting elements are aligned in both widthwise and lengthwise directions of said photosensitive material, and emit rays of different colors from one row to another to print said latent image in said different colors.

14. An optical printing head as recited in claim 1, wherein said light emitting elements are arranged in-between portions of the partitioning device.

15. An optical printing head as recited in claim 1, wherein:
said partitioning device comprises a plate-like structure with an upper and lower surface extending substantially parallel to the substrate;
the plate-like partitioning device comprises through holes located to radially enclose each of the light emitting elements; and
the upper and lower surfaces extend between the through holes.

16. An optical printing head as recited in claim 1, wherein:
the light emitting elements are positioned in at least four rows arranged orthogonally to the conveying direction of the photosensitive material;
the light emitting elements positioned in a first and third row of the at least four rows are aligned in a direction parallel to the conveying direction of said photosensitive material;
the light emitting elements positioned in a second and fourth row of the at least four rows are aligned in a direction parallel to the conveying direction of said photosensitive material; and
light emitting elements positioned in the first and the second rows are offset from each other, so as to have a minimum overlap in the conveying direction of said photosensitive material.

17. An optical printing head as recited in claim 16, wherein the offset is approximately equal to the size of the light emitting elements.

18. An optical printing head as recited in claim 16, wherein:
the light emitting elements positioned in the first and second rows emit a first color; and
the light emitting elements positioned in the third and fourth rows emit a second color, which is different from the first color.

19. A side-printing device as recited in claim 1, wherein:
the plurality of light emitting elements have a dark spot at a radially center portion thereof; and
the diffusion device equalizes the luminance difference between the dark spots and the remaining portions of the light emitting elements.

20. A side-printing device as recited in claim 1, wherein the diffusion device is semi-transparent, and comprises an array of micro lenses of a several micro millimeter size.

21. A side-printing device as recited in claim 1, wherein luminance reduction through the diffusion device is less than that of a luminance reduction through a diffusion plate of fogged glass.

22. A side-printing device as recited in claim 1, wherein less than all of the light emitting elements are activated to emit light at a single time, and specific patterns are thereby generated on the photosensitive material.

23. A side-printing device as recited in claim 1, wherein said photosensitive material is film.

24. An optical printing head of a side-printing device for printing data of a photosensitive material as a latent image on a side margin of said photosensitive material while said photosensitive material is being conveyed in a direction, said optical printing head comprising:
three light emitting element array units for emitting rays of three colors, each of said light emitting element array units comprising an array of light emitting elements mounted on a substrate and arranged along a perpendicular direction to the conveying direction of said photosensitive material, said light emitting elements emitting rays of one of said three colors, a partitioning device mounted on said substrate, for partitioning said light emitting elements from each other, and a diffusion device for diffusing rays from said light emitting elements;
dichroic mirrors for mixing the rays of three colors from said three light emitting element array units, and directing them toward an exit of said optical printing head; and
a converging lens system provided at the exit of said optical printing head, for projecting three color rays from said light emitting element array units onto said photosensitive material, wherein each of said light emitting elements of said three LED array units is assigned to record a dot at a a time when driven in synchronism with conveying movement of said photosensitive material, thereby to print said latent image line by line in said three colors.

25. An optical printing head as recited in claim 24, wherein each of said light emitting element array units further comprises a mask plate disposed on an opposite side of said diffusion device from said light emitting elements, said mask plate having openings in correspondence with said light emitting elements, said openings limiting heading directions of the rays from said light emitting elements and having a shape corresponding to an expected shape of said dot.

26. A side-printing device as recited in claim 24, wherein the dichroic mirrors allow red rays to pass therethrough.

27. A side-printing device as recited in claim 24, wherein at least one of the dichroic mirrors allows green rays to pass therethrough.

28. An optical printing head as recited in claim 24, wherein said photosensitive material is film.

29. A side-printing device for printing data of a photosensitive material as a latent image on a side margin of said photosensitive material while said photosensitive material is being conveyed in a direction, said side-printing device comprising three optical printing heads for emitting rays of three colors respectively, each of said optical printing heads comprising:
a plurality of light emitting elements mounted on a substrate and arranged along a perpendicular direction to the conveying direction of said photosensitive material, said light emitting elements emitting rays of one of said three colors;

a partitioning device mounted on said substrate, for partitioning said light emitting elements from each other;

a diffusion device for diffusing rays from said light emitting elements; and a conveying lens system for projecting rays from said light emitting elements onto said photosensitive material, wherein each of said light emitting elements of said three optical printing heads is assigned to record a dot of one color at a time when driven in synchronism with the conveying movement of said photo sensitive material, thereby to print said latent image line by line in said three colors.

30. A side-printing device as recited in claim 29, each of said optical printing heads further comprises a mask plate disposed between said diffusion device and said converging lens system, said mask plate having openings in correspondence with said light emitting elements, said openings limiting heading directions of the rays from said light emitting elements and having a shape corresponding to an expected shape of said dot.

31. A side-printing device as recited in claim 29, wherein:

the converging lens system project the rays from the respective light emitting elements at three different angles respective to the photosensitive material; and the rays projected from the respective light emitting elements are directed towards a single portion of the photosensitive material.

32. A side-printing device as recited in claim 29, wherein said photosensitive material is film.

* * * * *